US011612168B1

(12) United States Patent
Smith, Jr.

(10) Patent No.: US 11,612,168 B1
(45) Date of Patent: Mar. 28, 2023

(54) DRUM SMOKING ASSEMBLY

(71) Applicant: Hearth Products Controls Co., Miamisburg, OH (US)

(72) Inventor: Edwin Scott Smith, Jr., Scottsdale, AZ (US)

(73) Assignee: Hearth Products Controls Co., Miamisburg, OH (US)

( * ) Notice: Subject to any disclaimer, the term of this patent is extended or adjusted under 35 U.S.C. 154(b) by 393 days.

(21) Appl. No.: 16/512,123

(22) Filed: Jul. 15, 2019

Related U.S. Application Data

(60) Provisional application No. 62/671,947, filed on May 15, 2018.

(51) Int. Cl.
*A23B 4/044* (2006.01)
*A47J 37/07* (2006.01)

(52) U.S. Cl.
CPC .......... *A23B 4/044* (2013.01); *A47J 37/0704* (2013.01); *A47J 37/0718* (2013.01); *A47J 37/0786* (2013.01)

(58) Field of Classification Search
CPC .... A47J 37/07; A47J 37/0704; A47J 37/0718; A47J 37/0786; A47J 37/075; A23B 4/044
USPC .......................................................... 99/481
See application file for complete search history.

(56) References Cited

U.S. PATENT DOCUMENTS 9,339,145 B1 * 5/2016 Owczarzak ......... A47J 37/0713
D777,516 S * 1/2017 Hunsaker ...................... D7/417
2006/0213497 A1 * 9/2006 Orozco ............... A47J 37/0786
                                                        126/41 R
2007/0277807 A1 * 12/2007 Taban ................. A47J 37/0763
                                                        126/275 R
2008/0047541 A1 * 2/2008 Fou ......................... A47J 37/07
                                                        126/25 R (Continued)

FOREIGN PATENT DOCUMENTS

EP      2138081 A1 * 12/2009   .......... A47J 37/0704
FR      2685862 A1 *  7/1993   .......... A47J 37/0718
WO  WO-2018026041 A1 *  2/2018   .............. A47J 36/38

OTHER PUBLICATIONS

Screen shots of YouTube presentation for Hunsaker Smokers instructional video, 4 page, Nov. 2014 https://www.youtube.com/watch?v=V986b26UyeA.

(Continued)

*Primary Examiner* — John J Norton
(74) *Attorney, Agent, or Firm* — Thompson Hine LLP

(57) ABSTRACT

A drum smoking assembly is configured to utilize uniform, cyclonic circulation flow of air, heat and smoke for smoking and cooking food. The drum smoking assembly has a drum smoker that is approximately cylindrical and further comprises interior and exterior surfaces. Two side openings extend through the interior and exterior surfaces which are joined to air intakes tangentially connected to the exterior surface. A basket is arranged within the drum smoker above the first side opening and the second side opening. A twelve vane straightening perforate plate is arranged within the drum smoker above the basket. A lid is rotationally connected to the drum smoker and further comprising a chimney cap. A heat source in the basket pulls air through the first air intake and the second air intake that is then pushed through the twelve vane straightening perforate plate toward the chimney cap, creating a cyclonic air flow.

4 Claims, 4 Drawing Sheets

(56) References Cited

U.S. PATENT DOCUMENTS

| | | | | |
|---|---|---|---|---|
| 2014/0299119 | A1* | 10/2014 | Warner | F23Q 7/02 |
| | | | | 126/25 B |
| 2015/0079251 | A1* | 3/2015 | Parrish | A47J 37/049 |
| | | | | 426/314 |
| 2021/0325047 | A1* | 10/2021 | Lieftink | F24B 15/04 |
| 2022/0160174 | A1* | 5/2022 | Matz | A47J 37/0786 |

OTHER PUBLICATIONS

The Virtual Weber Bulletin Board, Hunsaker Vortex Plate for WSM Charcoal Ring, 5 pages, 2018 Hunsaker Vortex Plate for WSM Charcoal Ring | The Virtual Weber Bulletin Board (tvwbb.com).

Hunsaker Smokers FAQs, 5 pages, Jun. 11, 2019 FAQs—Hunsaker Vortex Smokers (archive.org).

Screen shot of Facebook group "Friends of Hunsaker Vortex Smokers", 2015 https://www.facebook.com/groups/557199244420576.

YouTube presentation for "Hunsaker Smokers instructional video", Nov. 2014 https://www.youtube.com/watch?v=V986b26UyeA.

* cited by examiner

DRUM SMOKING ASSEMBLY

RELATED APPLICATION

This application claims priority to provisional patent application U.S. Ser. No. 62/671,947 filed on May 15, 2018, the entire contents of which is herein incorporated by reference.

BACKGROUND

The embodiments herein relate generally to equipment used to prepare food for human consumption.

Prior to embodiments of the disclosed invention, a uniform, cyclonic circulation flow of air, heat and smoke for smoking and cooking meat, fish and fowl products did not exist. Embodiments of the disclosed invention solve this problem.

SUMMARY

A drum smoking assembly is configured to utilize uniform, cyclonic circulation flow of air, heat and smoke for smoking and cooking food. The drum smoking assembly has a drum smoker that is approximately cylindrical and further comprises a drum smoker interior surface and a drum smoker exterior surface. A first side opening extends through the drum smoker interior surface and the drum smoker exterior surface that is joined to a first air intake tangentially connected to the drum smoker exterior surface. A second side opening extends through the drum smoker interior surface and the drum smoker exterior surface that is joined to a second air intake tangentially connected to the drum smoker exterior surface. A basket is arranged within the drum smoker above the first side opening and the second side opening. A twelve vane straightening perforate plate is arranged within the drum smoker above the basket. A lid is rotationally connected to the drum smoker and further comprising a chimney cap. A heat source in the basket pulls air through the first air intake and the second air intake that is then pushed through the twelve vane straightening perforate plate toward the chimney cap, creating a uniform, cyclonic circulation flow of air, heat and smoke for smoking and cooking food within the drum smoker.

In some embodiments, a stop pin and a quick release pin can join the lid to the drum smoker. Additionally, a second stop pin and a second quick release pin can further join the lid to the drum smoker.

In some embodiments, a front wheel can be joined to the drum smoker exterior surface between the first side opening and the second side opening. An ash plate can be arranged beneath the first air intake and the second air intake within the drum smoker.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
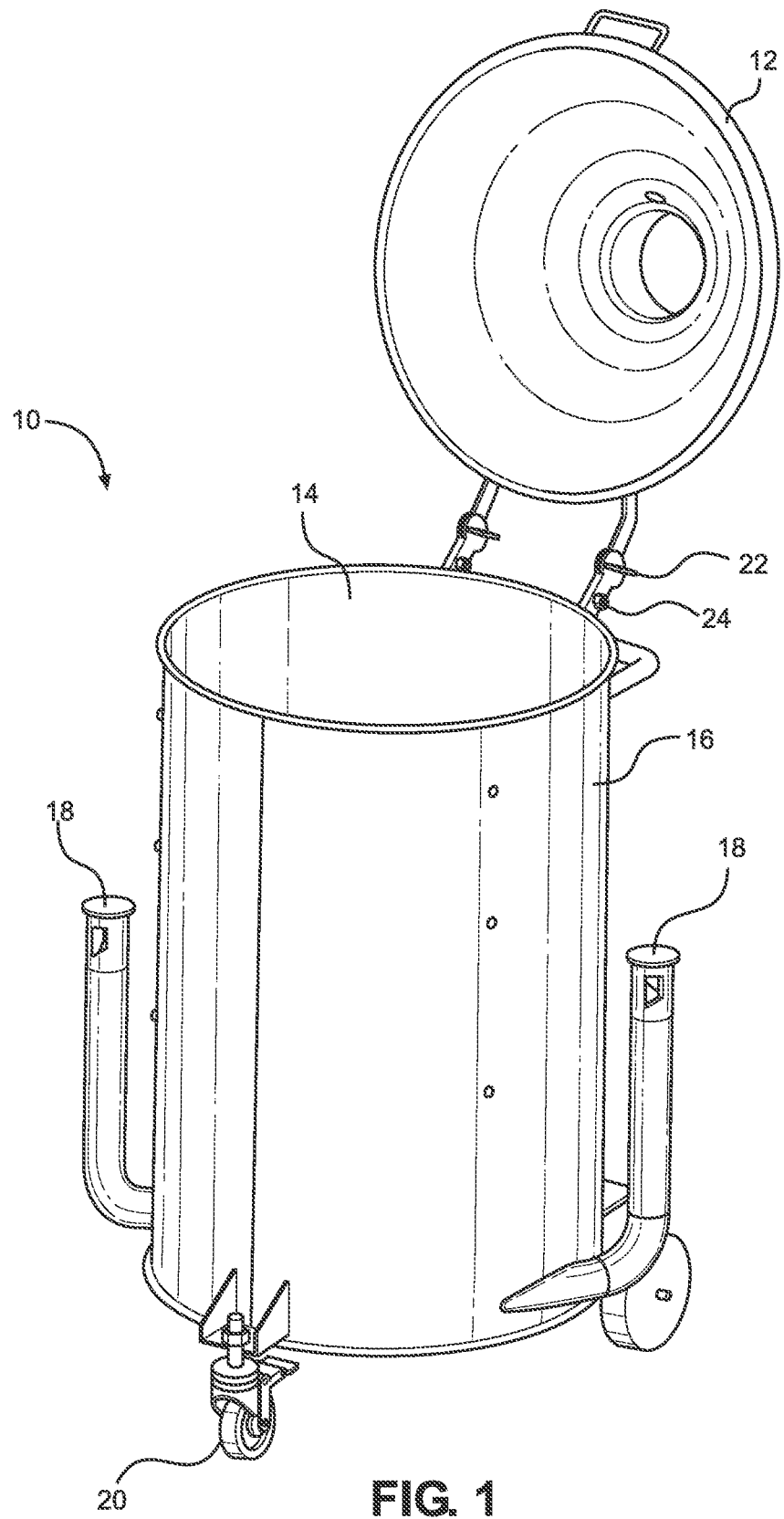
FIG. 1 shows a front perspective view of one embodiment of the present invention.
Figure 2:
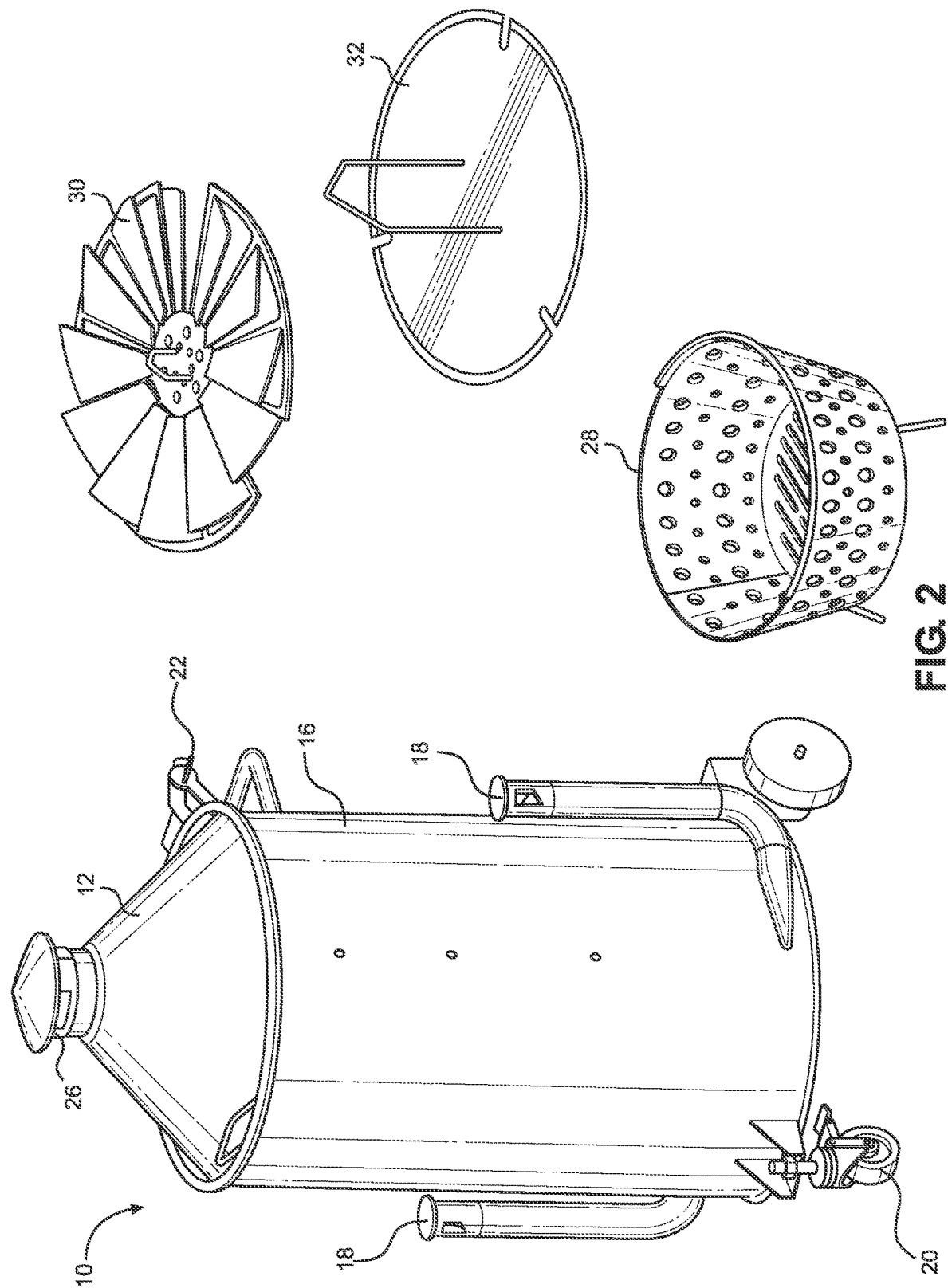
FIG. 2 shows a front perspective view of one embodiment of the present invention.
Figure 3:
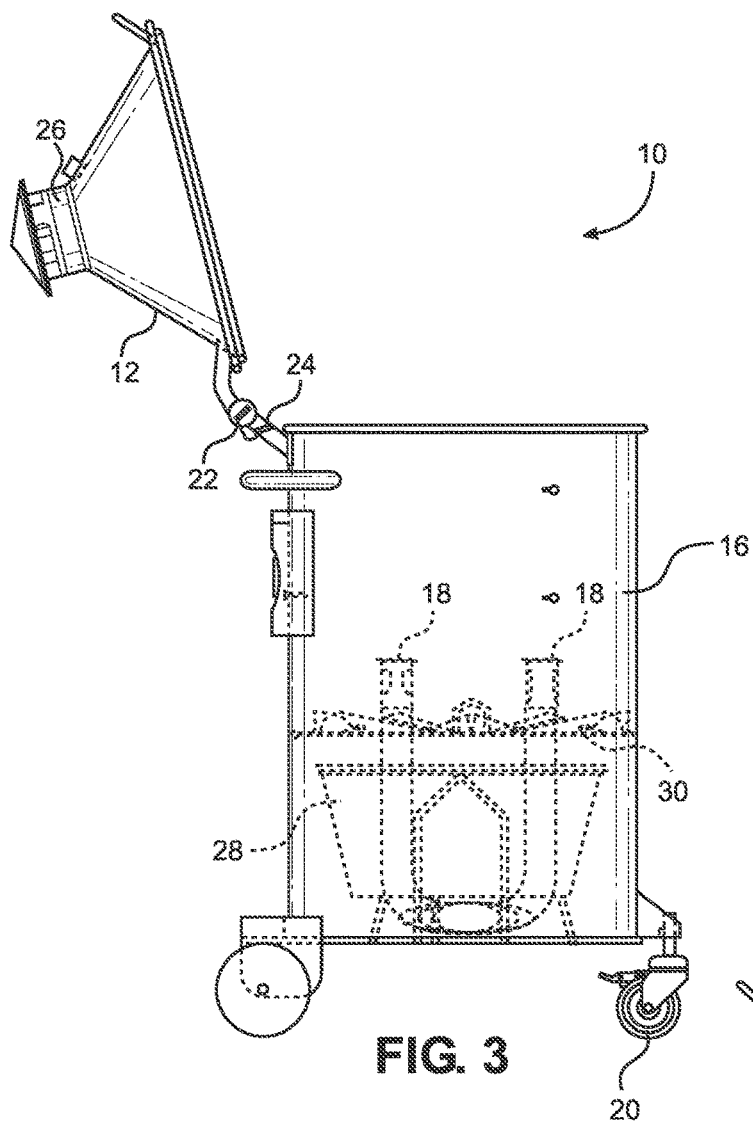
FIG. 3 shows a side view of one embodiment of the present invention.
Figure 4:
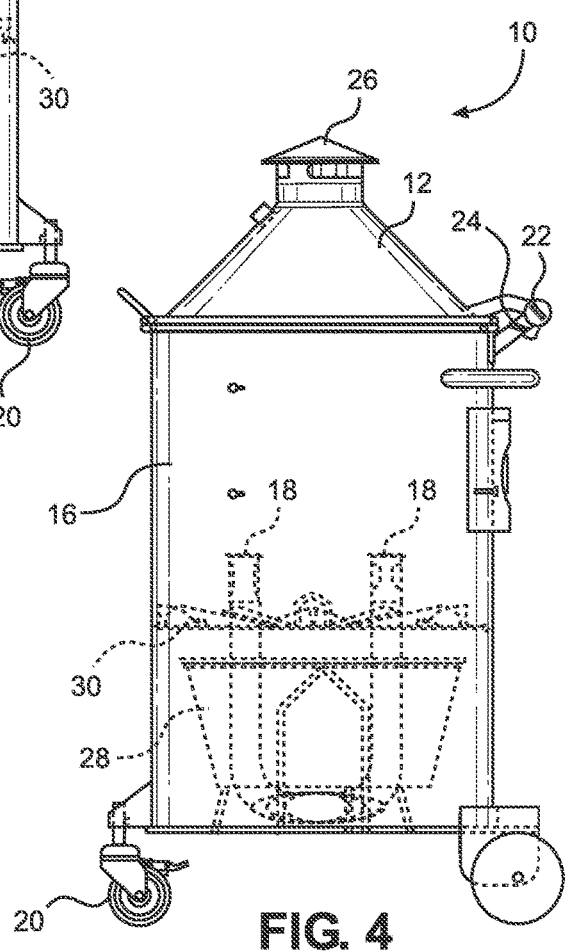
FIG. 4 shows a side view of one embodiment of the present invention.
Figure 5:
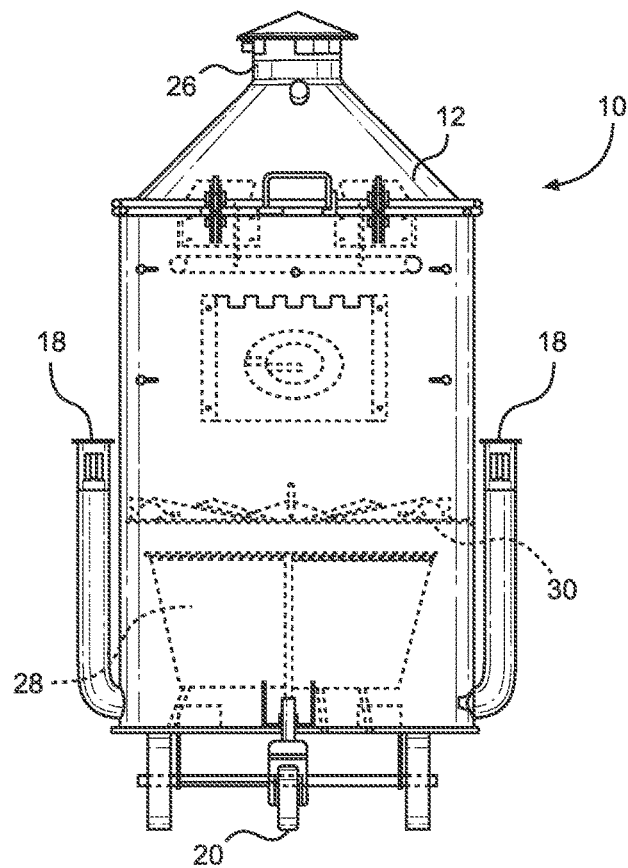
FIG. 5 shows a front view of one embodiment of the present invention.
Figure 6:
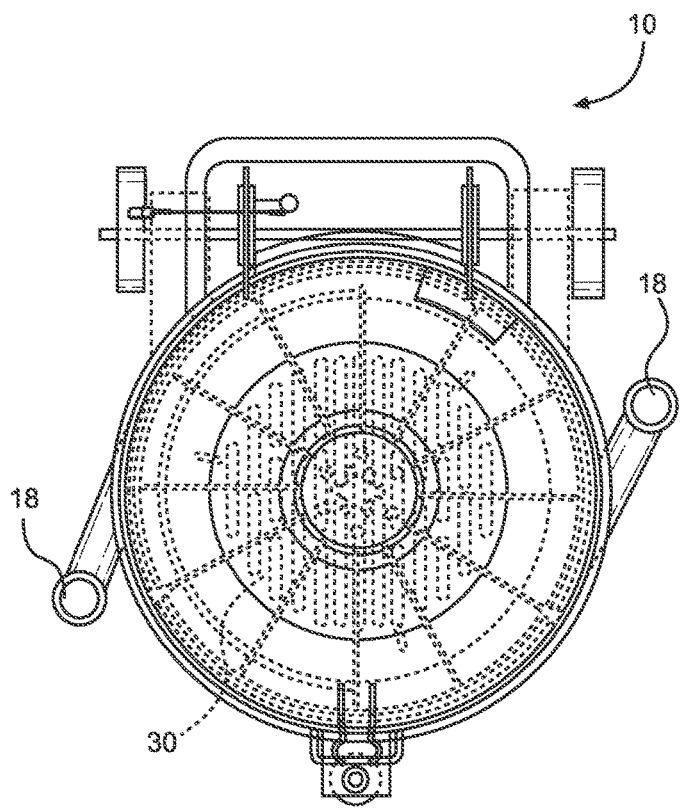
FIG. 6 shows a top view of one embodiment of the present invention.

By way of example, and referring to FIG. 1, one embodiment of the drum smoking assembly further comprises a drum smoker 10 rotationally coupled to a lid 12. The drum smoker 10 is approximately cylindrical and further comprises a drum smoker interior surface 14 and a drum smoker exterior surface 16. The drum smoker 10 has a first side opening that is joined to a first air intake 18 and a second side opening that is joined to a second air intake 18. The drum smoker exterior surface 16 is mechanically coupled to a front wheel 20.

The lid 12 is joined to the drum smoker 10 with a stop pin 22 and a quick release pin 24. In some embodiments, a second stop pin 22 and a second quick release pin 24 can also be used. The lid 12 is mechanically coupled to a chimney cap 26.

Immediately against a drum smoker bottom surface is an ash plate 32 which can be adjacent to the drum smoker interior surface 14. Upon the ash plate 32 rests a basket 28 which can be arranged within or adjacent to the drum smoker interior surface 14. Upon the basket 28 rests a twelve vane straightening perforate plate 30 which can be arranged within or adjacent to the drum smoker interior surface 14.

It is critical that the first air intake 18 and the second air intake 18 have a portion arranged tangentially to the drum smoker exterior surface 16. It is further critical that the twelve vane straightening perforate plate 30 be arranged above the first air intake 18, the second air intake 18, and the basket 28.

In use, a heat source is inserted into the basket 28. This causes the air around the basket 28 to rise creating a vacuum pulling more air into the drum smoker 10 from the first air intake 18 and the second air intake 18. The air continues to rise toward the chimney cap 26 where the air is vented. Enroute to the chimney cap 26, the air passes through the twelve vane straightening perforate plate 30 which cases the air to rotate in a vortex in the space between the twelve vane straightening perforate plate 30 and the chimney cap 26.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A drum smoking assembly, configured to utilize uniform, cyclonic circulation flow of air, heat and smoke for smoking and cooking food; the drum smoking assembly comprising:
   a drum smoker that is approximately cylindrical and further comprises a drum smoker interior surface and a drum smoker exterior surface;
   a first side opening extending through the drum smoker interior surface and the drum smoker exterior surface that is joined to a first air intake tangentially connected to the drum smoker exterior surface;
   a second side opening extending through the drum smoker interior surface and the drum smoker exterior surface that is joined to a second air intake tangentially connected to the drum smoker exterior surface;
   a basket, arranged within the drum smoker above the first side opening and the second side opening;
   a twelve vane straightening perforate plate, arranged within the drum smoker above the basket;
   a lid, rotationally connected to the drum smoker and further comprising a chimney cap;
   wherein a heat source in the basket pulls air through the first air intake and the second air intake that is then pushed through the twelve vane straightening perforate plate toward the chimney cap, creating a uniform, cyclonic circulation flow of air, heat and smoke for smoking and cooking food within the drum smoker.

2. The drum smoking assembly of claim 1, further comprising:
   a stop pin and a quick release pin, joining the lid to the drum smoker; and
   a second stop pin and a second quick release pin, further joining the lid to the drum smoker.

3. The drum smoking assembly of claim 2, further comprising a front wheel, joined to the drum smoker exterior surface between the first side opening and the second side opening.

4. The drum smoking assembly of claim 2, further comprising an ash plate, arranged beneath the first air intake and the second air intake within the drum smoker.

* * * * *